US012620257B2

(12) United States Patent
Seo et al.

(10) Patent No.: US 12,620,257 B2
(45) Date of Patent: May 5, 2026

(54) MULTIPLE SENSOR PAIRING WITH SINGLE CONTROLLER FOR DISPLAY APPLICATIONS

(71) Applicant: QUALCOMM Incorporated, San Diego, CA (US)

(72) Inventors: Jae Hyeong Seo, Pleasanton, CA (US); Jessica Liu Strohmann, Cupertino, CA (US); Kostadin Dimitrov Djordjev, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/789,113

(22) Filed: Jul. 30, 2024

(65) Prior Publication Data

US 2026/0038296 A1     Feb. 5, 2026

(51) Int. Cl.
*G06V 40/13* (2022.01)
*G01H 11/08* (2006.01)
(Continued)

(52) U.S. Cl.
CPC ......... *G06V 40/1306* (2022.01); *G01H 11/08* (2013.01); *G01S 7/52079* (2013.01); *G01S 15/8906* (2013.01)

(58) Field of Classification Search
None
See application file for complete search history.

(56) References Cited

U.S. PATENT DOCUMENTS 10,438,040 B2    10/2019 Strohmann et al.
10,552,658 B2     2/2020 Strohmann et al.
(Continued)

FOREIGN PATENT DOCUMENTS

| TW | M611578 U | 5/2021 |
| WO | 2021201602 A1 | 10/2021 |
| WO | 2023009908 A1 | 2/2023 |

OTHER PUBLICATIONS

Herrera B., et al., "In-Display Proximity and Gesture Sensor with Piezoelectric Polymer Technology", 2021 IEEE International Ultrasonics Symposium (IUS), Xi'an, China, Sep. 11-16, 2021, 4 Pages, doi: 10.1109/IUS52206.2021.9593892.

(Continued)

*Primary Examiner* — Joseph R Haley
(74) *Attorney, Agent, or Firm* — QUALCOMM Incorporated

(57)     ABSTRACT

An ultrasonic sensor system may comprise sensors (e.g., fingerprint sensors) configured to obtain information using ultrasonic waves. The ultrasonic sensor system may further include a controller chip configured to obtain the information, and a first flexible printed circuit substrate onto which the controller chip and a first sensor are mounted. The first flexible printed circuit substrate may further comprise an electrical connector. The ultrasonic sensor system may further include a second flexible printed circuit substrate, electrically coupled with the first flexible printed circuit substrate via the electrical connector, onto which a second sensor is mounted. The first sensor may be electrically coupled with the controller chip via the first flexible printed circuit substrate, and the second sensor may be electrically coupled with the controller chip via the second flexible printed circuit substrate, the electrical connector, and the first flexible printed circuit substrate.

14 Claims, 10 Drawing Sheets

(51) Int. Cl.
    *G01S 7/52*          (2006.01)
    *G01S 15/89*       (2006.01)

(56)           References Cited

U.S. PATENT DOCUMENTS

| | | | |
|---|---|---|---|
| 11,087,109 B1 * | 8/2021 | Strohmann et al. | |
| 11,379,068 B1 * | 7/2022 | Kim | G06F 3/0412 |
| 11,887,397 B2 | 1/2024 | Gudivada et al. | |
| 2017/0168629 A1 * | 6/2017 | Lai | G06F 3/047 |
| 2018/0089485 A1 | 3/2018 | Bok | |
| 2019/0242856 A1 * | 8/2019 | Liao | G01H 11/08 |
| 2020/0133335 A1 * | 4/2020 | Wu | H04M 1/0268 |
| 2021/0132660 A1 * | 5/2021 | Delaporte | G06F 1/1679 |
| 2022/0058357 A1 * | 2/2022 | Xu | G01S 7/5205 |

OTHER PUBLICATIONS

Strohmann J.L., et al., "Large Area Multi-Functional Under-Display Ultrasound Sensor: Fingerprint, Passive Stylus, Heart Rate, Force Sensing, Contact Gesture", 2023 IEEE International Ultrasonics Symposium (IUS), Montreal, QC, Canada, Sep. 3-8, 2023, 4 Pages, doi: 10.1109/IUS51837.2023.10307163.
Strohmann J.L., et al., "Ultrasonic Biometric Authentication System with Contact Gesture Sensing", 2020 IEEE International Ultrasonics Symposium (IUS), Las Vegas, NV, USA, Sep. 7-11, 2020, 3 Pages, doi: 10.1109/IUS46767.2020.9251347.
International Search Report and Written Opinion PCT/US2025/035935 ISA/EPO Oct. 10, 2025.

* cited by examiner 100-1

110

100-2

120-1 120-2

140

130 140

150

160-1 170 160-2 170 160-3

180 180

500

510-1

510-2

520

530

540

600

610-1

610-2

670

660

650

690

620

680

630

640

MULTIPLE SENSOR PAIRING WITH SINGLE CONTROLLER FOR DISPLAY APPLICATIONS

TECHNICAL FIELD

This disclosure relates generally to fingerprint sensors and other sensors used with displays, and methods, devices, and systems related to such sensors.

DESCRIPTION OF THE RELATED TECHNOLOGY

Biometric authentication can be an important feature for controlling access to electronic devices, etc. Many existing products include fingerprint and other sensors for biometric authentication, gesture detection, and other functions. Although existing fingerprint sensors provide benefits, improved methods and devices would be desirable.

SUMMARY

A first example ultrasonic sensor system, according to the disclosure, comprises a plurality of ultrasonic sensors, where each ultrasonic sensor of the plurality of ultrasonic sensors is configured to obtain respective sensor information by generating and receiving ultrasonic waves traveling through a display. The ultrasonic sensor system further comprises a controller chip configured to obtain the respective sensor information from each ultrasonic sensor of the plurality of ultrasonic sensors, and a first flexible printed circuit substrate onto which the controller chip and a first ultrasonic sensor of the plurality of ultrasonic sensors are mounted. The first flexible printed circuit substrate may comprise an electrical connector. The ultrasonic sensor system further comprises a second flexible printed circuit substrate onto which a second ultrasonic sensor of the plurality of ultrasonic sensors is mounted. The second flexible printed circuit substrate may be electrically coupled with the first flexible printed circuit substrate via the electrical connector. The first ultrasonic sensor may be electrically coupled with the controller chip via the first flexible printed circuit substrate, and the second ultrasonic sensor may be electrically coupled with the controller chip via the second flexible printed circuit substrate, the electrical connector, and the first flexible printed circuit substrate.

A second example ultrasonic sensor system, according to the disclosure, comprises a plurality of ultrasonic sensors. Each ultrasonic sensor of the plurality of ultrasonic sensors may be configured to obtain respective sensor information by generating and receiving ultrasonic waves traveling through a display. The ultrasonic sensor system further comprises a controller chip configured to obtain the respective sensor information from each ultrasonic sensor of the plurality of ultrasonic sensors. The ultrasonic sensor system further comprises a set of one or more flexible printed circuit substrates electrically coupled with the controller chip and the plurality of ultrasonic sensors, the set of flexible printed circuit substrates electrically coupling the controller chip with each ultrasonic sensor of the plurality of ultrasonic sensors.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1A:
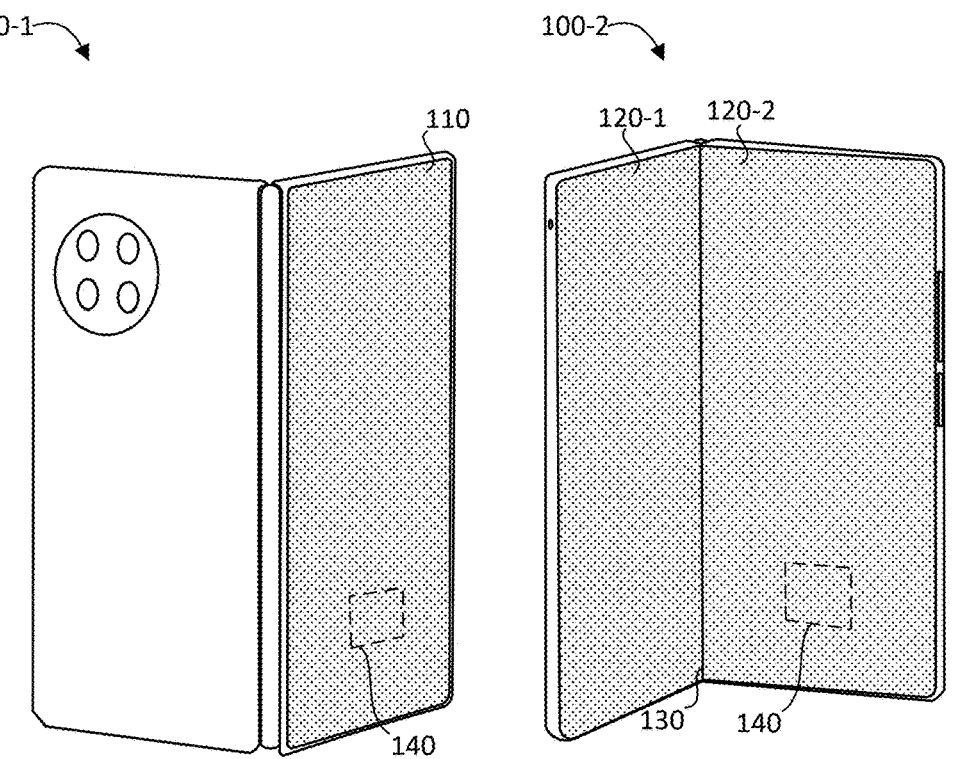
FIGS. 1A and 1B are illustrations of example electronic devices with foldable displays.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, augmented reality (AR) glasses, AR or virtual reality (VR) headsets, motorcycle visors, patches, etc., Bluetooth® devices, personal data assistants (PDAs), hand-held or portable computers, netbooks, notebooks, smartbooks, tablets, printers, copiers, scanners, facsimile devices, global positioning system (GPS) receivers/navigators, cameras, digital media players, game consoles, electronic reading devices (e.g., e-readers), mobile health devices, vehicle displays (including odometer and speedometer displays, etc.), cockpit controls and/or displays, camera view displays (such as the display of a rear view camera in a vehicle), and/or other electronic devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes, and electronic test equipment. Thus, the teachings are not intended to be limited to the implementations depicted solely in the figures, but instead have wide applicability as will be readily apparent to one having ordinary skill in the art.

The use of fingerprint sensors in electronic devices has greatly increased their security. (As used herein, the term "finger" may correspond to any digit, including a thumb. Accordingly, a thumbprint is a type of fingerprint.) For example, not only can fingerprint sensors be used to help grant secure access to the device (e.g., by "unlocking" the device to get past a lock screen to access the functionality of the device) but they can also be used to help grant secure access to applications and/or other features executed by the device. In this way, fingerprint sensors can help prevent unwanted access to electronic devices and applications.

With the introduction of foldable/rollable displays and multi-display devices, however, comes an increased cost in the associated fingerprint sensors. Incorporating a fingerprint sensor (e.g., an ultrasonic fingerprint sensor) into a display typically includes not only the cost of the fingerprint sensor itself but also the cost of a corresponding controller chip (e.g., controlling application-specific integrated circuit (ASIC) and/or Tx power chip (e.g., amplifier or LC circuit)), which is often far more expensive than the fingerprint sensor. Moreover, each fingerprint sensor traditionally requires a separate controller chip, as controller chips are typically designed to control only one fingerprint sensor. Thus, including multiple fingerprint sensors corresponding to multiple displays and/or multiple sections of a foldable/rollable display can significantly increase the cost because each additional fingerprint sensor would come with a corresponding controller chip.

Embodiments disclosed herein address these and other issues by enabling a single controller chip to control a plurality of fingerprint sensors. According to some embodiments, for example, a single controller chip may be included on a flexible substrate (e.g., a flexible printed circuit (FPC)) with two or more fingerprint sensors, where the flexible substrate enables each of the two or more fingerprint sensors to be used with a different respective display or a different respective planar portion of a foldable display. In the latter case, for example, the flexible substrate may bridge one or more folds of the foldable display, allowing for fingerprint sensors (driven by a single controller chip) to be included on different sides of the one or more folds. According to some embodiments, a set of one or more flexible substrates may be used, where the flexible substrates are electronically coupled using one or more connectors. For example, a first fingerprint sensor and the controller chip may be mounted on a first flexible substrate, and a second fingerprint sensor may be mounted on a second flexible substrate that is electronically coupled with the first flexible substrate via an electronic connector. Such embodiments may further include a memory (e.g., an erasable programmable read-only memory (EPROM)) mounted on the second flexible substrate and configured to store tuning information for the second fingerprint sensor. According to some embodiments, this tuning information may be related to the controller chip via an application processor (e.g., to which the set of one or more flexible substrates is electrically connected). These and other features are described in further detail below.

Particular implementations of the subject matter described in this disclosure may be implemented to realize one or more of the following potential advantages. In some aspects, by enabling a single controller chip to control two or more fingerprint sensors, embodiments can help realize cost savings without sacrificing functionality or impacting user experience. Further, in some aspects, by mounting a controller chip and multiple fingerprint sensors onto a single flexible printed circuit substrate, embodiments can help simplify the incorporation of the fingerprint sensors into a device during manufacture. Other advantages include advanced security (for example, authentications on 2 fingerprint sensors can be sequential or in parallel or in a specific order to enhance security). In some aspects, by using embodiments in which a controller chip and a single fingerprint sensor are mounted on a first flexible printed circuit substrate that is electronically connected with one or more additional flexible printed circuit substrates having respective fingerprint sensors, embodiments can help simplify the manufacturer of the flexible printed circuit substrate modules themselves. Moreover, according to some aspects, by including a memory on each of the one or more additional flexible printed circuit substrates that stores tuning parameters for the respective fingerprint sensor of the additional flexible printed circuit substrate, embodiments can simplify the manufacturing process by allowing modules comprising the additional flexible printed circuit substrates with respective fingerprint sensors and memories to be manufactured separately from the controller chip. These and other advantages will be apparent to a person of ordinary skill in the art in view of the embodiments described below, which follow a brief review of the relevant technology.

It can be noted that embodiments described herein focused primarily on ultrasonic fingerprint sensors used in foldable displays. However, embodiments are not so limited. Specifically, some embodiments may use traditional (non-foldable) displays, other types of display-based sensors (in addition or as an alternative to fingerprint sensors), sensors utilizing different technologies (e.g., ultrasonic, capacitive, optical, etc.), or any combination thereof. Some embodiments may use sensors that are capable of sensing multiple types of sensing. For example, some multifunction (e.g., ultrasonic) sensors may be capable of sensing fingerprints, since stylus input, gesture recognition, etc.

FIG. 1A are illustrations of perspective views of the outside 100-1 and inside 100-2 of a first example electronic device (e.g., mobile phone) that may utilize multiple fingerprint sensors. In this example, the device includes and outside display 110, and a foldable inner display with two portions 120-1 and 120-2 separated by a fold 130. The inner display, which includes both portions 120-1 and 120-2 is referred to herein as inner display 120. Foldable displays of electronic devices, such as inner display 120, are often divided into planar sections (e.g., portions 120-1 and 120-2), as illustrated in FIG. 1A. Fingerprint sensors can be embedded in or behind displays (also referred to herein as "below-display" or "under-display" sensors) at certain locations, as indicated by boxes 140. As with other figures appended hereto, the types, numbers and arrangements of elements that are shown in FIG. 1A are merely presented by way of example. Other examples may include different types of elements, numbers of elements, arrangements of elements, or combinations thereof.

Figure 1B:
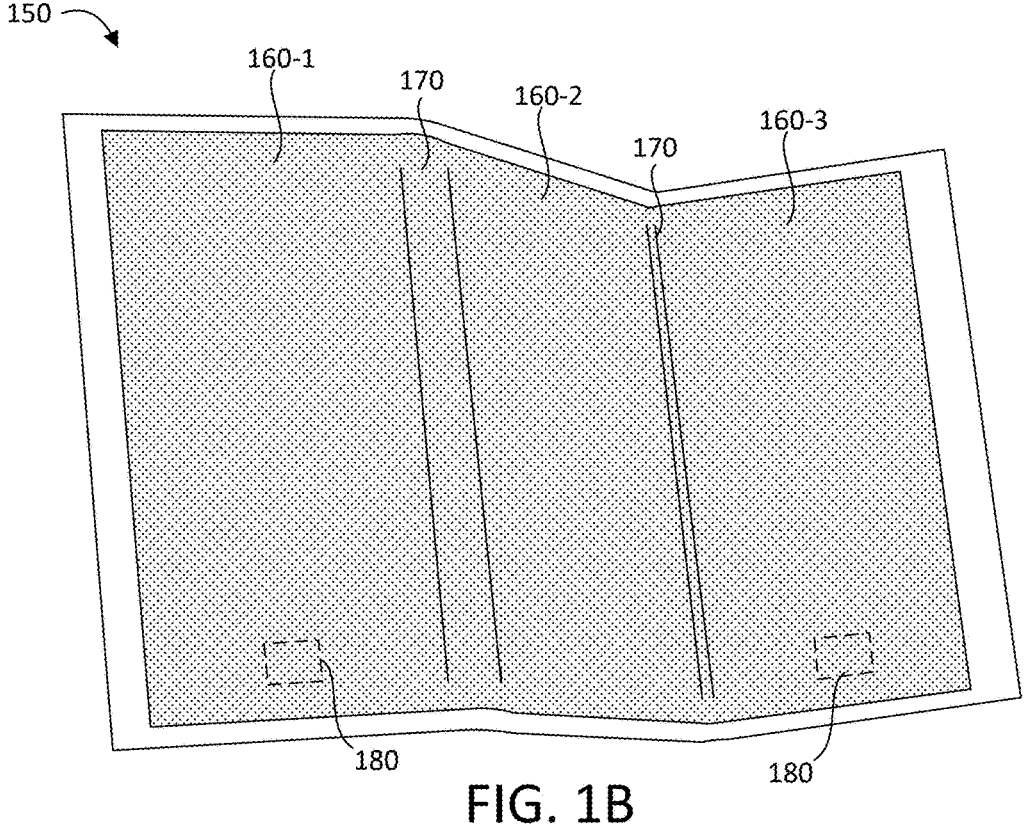

FIG. 1B is an illustration of a perspective view of another type of electronic device 150 that may utilize multiple fingerprint sensors. In this example, the device has a display 160 with three portions 160-1, 160-2, and 160-3, which are separated by folds 170. Fingerprint sensors are located within the display 160, as illustrated by boxes 180.

According to some examples, the fingerprint sensors such as those illustrated in FIGS. 1A and 1B may be, or may include, layers of an ultrasonic fingerprint sensor, which may be flexible. Alternatively, or additionally, in some implementations, the fingerprint sensors may be, or may include, another type of flexible fingerprint sensor, such as a flexible optical fingerprint sensor, a flexible capacitive fingerprint sensor, etc.

However, below-display ultrasonic fingerprint sensors have potential advantages over, for example, below-display optical fingerprint sensors. Background light cancellation is difficult for under-display optical fingerprint sensors: the light transmitted through the display by the optical fingerprint sensor changes the background light levels.

In some examples, an ultrasonic fingerprint sensor may comprise a (e.g., optionally) flexible fingerprint sensor stack, which may include an ultrasonic receiver array and a separate ultrasonic transmitter or transmitter array. In some such examples, the ultrasonic transmitter may include an ultrasonic plane-wave generator. However, various examples of ultrasonic fingerprint sensors are disclosed herein, some of which may include a separate ultrasonic transmitter and some of which may not. For example, in some implementations, the flexible fingerprint sensor stack may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The flexible fingerprint sensor stack may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from the fingerprint sensor stack, or from a fingerprint sensor that includes the flexible fingerprint sensor stack, may sometimes be referred to herein as "fingerprint sensor data," "fingerprint sensor signals," "fingerprint image data," etc., whether or not the received data corresponds to an actual digit or another object from which the flexible fingerprint sensor stack has received data. Such data will generally be received from the fingerprint sensor in the form of electrical signals. Accordingly, without additional processing such image data would not necessarily be perceivable by a human being as an image.

Figure 2A:
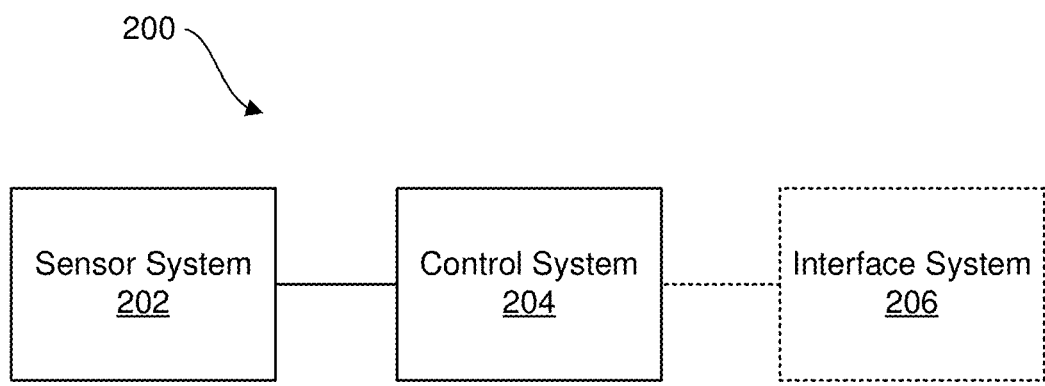
FIG. 2A is a block diagram of components of an example ultrasonic sensing system, according to some embodiments.

FIG. 2A shows a block diagram representation of components of an example ultrasonic sensing system 200 according to some implementations, which may correspond to an ultrasonic fingerprint sensor as described herein, and/or an electronic module comprising one or more ultrasonic fingerprint sensors and one or more controller chips. (Such modules are described in more detail below). As shown, the ultrasonic sensing system 200 may include a sensor system 202 and a control system 204 electrically coupled to the sensor system 202. The sensor system 202 may be capable of scanning an object and providing raw measured image data usable to obtain an object signature such as, for example, a fingerprint of a human finger. The control system 204 may be capable of controlling the sensor system 202 and processing the raw measured image data received from the sensor system. In some implementations, the ultrasonic sensing system 200 may include an interface system 206 capable of transmitting or receiving data, such as raw or processed measured image data, to or from various components within or integrated with the ultrasonic sensing system 200 or, in some implementations, to or from various components, devices or other systems external to the ultrasonic sensing system.

Figure 2B:
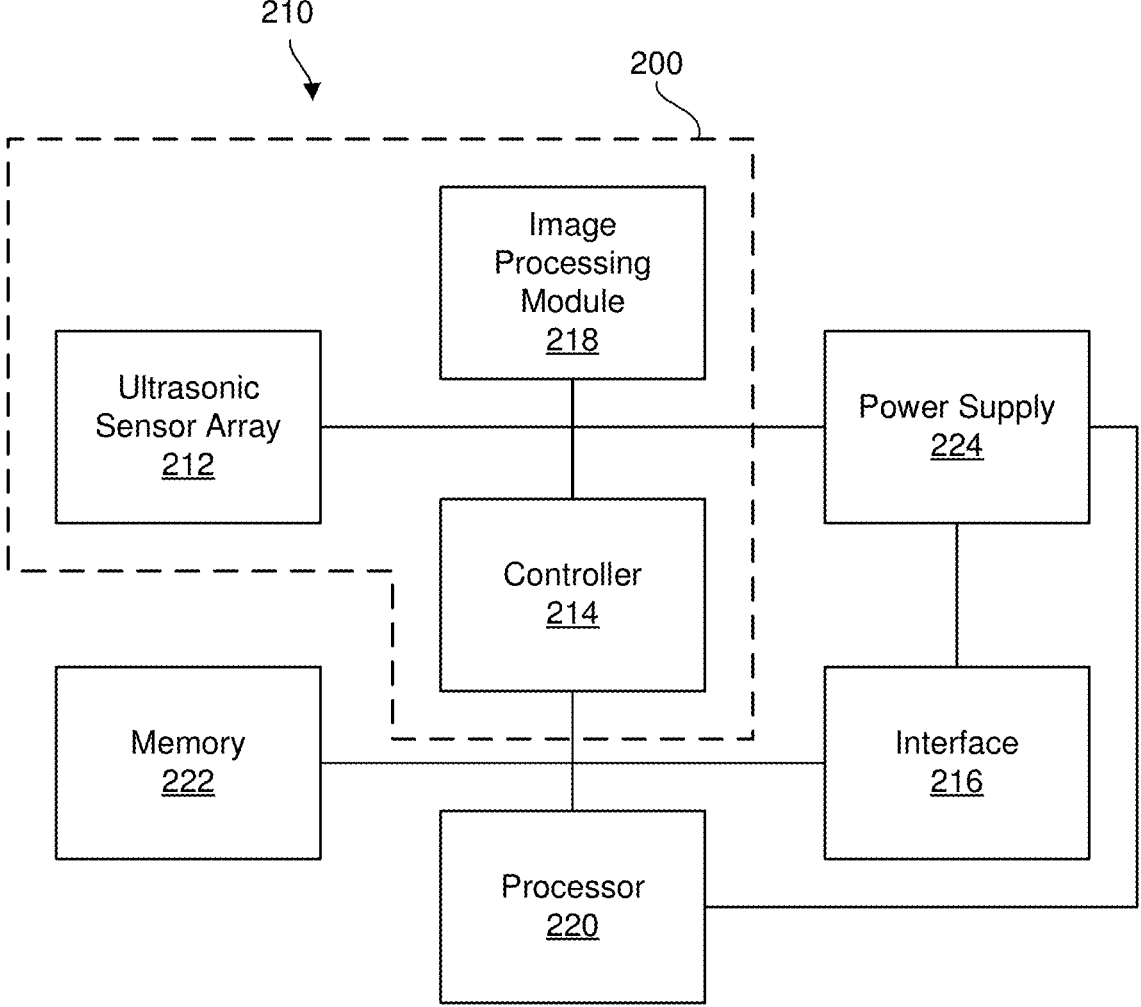
FIG. 2B is a block diagram of components of an example mobile device, according to some embodiments.

FIG. 2B shows a block diagram representation of components of an example mobile device 210 that includes the ultrasonic sensing system 200 of FIG. 2A. For example, the mobile device 210 may be a block diagram representation of the mobile device 100 shown in and described with reference to FIG. 1 above. The sensor system 202 of the ultrasonic sensing system 200 of the mobile device 210 may be implemented with an ultrasonic sensor array 212. The control system 204 of the ultrasonic sensing system 200 may be implemented with a controller 214 that is electrically coupled to the ultrasonic sensor array 212. While the controller 214 is shown and described as a single component, in some implementations, the controller 214 may collectively refer to two or more distinct control units or processing units in electrical communication with one another. In some implementations, the controller 214 may include one or more of a general purpose single- or multi-chip processor, a central processing unit (CPU), a digital signal processor (DSP), an application processor, an application specific integrated circuit (ASIC), a field programmable gate array (FPGA) or other programmable logic device (PLD), discrete gate or transistor logic, discrete hardware components, or any combination thereof designed to perform the functions and operations described herein. A controller 214 integrated into an integrated circuit (IC), such as an ASIC or CPU, may be referred to herein as a controller chip.

The ultrasonic sensing system 200 of FIG. 2B may include an image processing module 218. In some implementations, raw measured image data provided by the ultrasonic sensor array 212 may be sent, transmitted, communicated or otherwise provided to the image processing module 218. The image processing module 218 may include any suitable combination of hardware, firmware and software configured, adapted or otherwise operable to process the image data provided by the ultrasonic sensor array 212. In some implementations, the image processing module 218 may include signal or image processing circuits or circuit components including, for example, amplifiers (such as instrumentation amplifiers or buffer amplifiers), analog or digital mixers or multipliers, switches, analog-to-digital converters (ADCs), passive filters or active analog filters, among others. In some implementations, one or more of such circuits or circuit components may be integrated within the controller 214, for example, where the controller 214 is implemented as a system-on-chip (SoC) or system-in-package (SIP). In some implementations, one or more of such circuits or circuit components may be integrated within a DSP included within or coupled to the controller 214. In some implementations, the image processing module 218 may be implemented at least partially via software. For example, one or more functions of, or operations performed by, one or more of the circuits or circuit components just described may instead be performed by one or more software modules executing, for example, in a processing unit of the controller 214 (such as in a general-purpose processor or a DSP). In some implementations, the image processing module 218 or portions thereof may be implemented in software that may run on an application processor such as processor 220 associated with the mobile device 210. The application processor may have a dedicated coprocessor and/or software modules for secure processing of the biometric image data within the application processor (sometimes referred to as the "trust zone").

In some implementations, in addition to the ultrasonic sensing system 200, the mobile device 210 may include a separate processor 220, a memory 222, an interface 216, and a power supply 224. In some implementations, the controller 214 of the ultrasonic sensing system 200 may control the ultrasonic sensor array 212 and the image processing module 218, and the processor 220 of the mobile device 210 may control other components of the mobile device 210. In some implementations, the processor 220 communicates data to the controller 214 including, for example, instructions or commands. In some such implementations, the controller 214 may communicate data to the processor 220 including, for example, raw or processed image data (also referred to as "image information"). It should also be understood that, in some other implementations, the functionality of the controller 214 may be implemented entirely, or at least partially, by the processor 220. In some such implementations, a separate controller 214 for the ultrasonic sensing system 200 may not be required because the functions of the controller 214 may be performed by the processor 220 of the mobile device 210.

Depending on the implementation, one or both of controller 214 and processor 220 may store data in the memory 222. For example, the data stored in the memory 222 may include raw measured image data, filtered or otherwise processed image data, estimated image data, or final refined image data. The memory 222 may store processor-executable code or other executable computer-readable instructions capable of execution by one or both of controller 214 and the processor 220 to perform various operations (or to cause other components such as the ultrasonic sensor array 212, the image processing module 218, or other modules to perform operations), including any of the calculations, computations, estimations or other determinations described herein. It should also be understood that the memory 222 may collectively refer to one or more memory devices (or "components"). For example, depending on the implementation, the controller 214 may have access to and store data in a memory device different from the processor 220. In some implementations, one or more of the memory components may be implemented as a NOR- or NAND-based flash memory array. In some other implementations, one or more of the memory components may be implemented as a different type of non-volatile memory. Additionally, in some implementations, one or more of the memory components may include a volatile memory array such as, for example, a type of RAM.

In some implementations, the controller 214 or the processor 220 may communicate data stored in the memory 222 or data received directly from the image processing module 218 through an interface 216. For example, such communicated data can include image data or data derived or otherwise determined from image data. The interface 216 may collectively refer to one or more interfaces of one or more various types. In some implementations, the interface 216 may include a memory interface for receiving data from or storing data to an external memory such as a removable memory device. Additionally or alternatively, the interface 216 may include one or more wireless network interfaces or one or more wired network interfaces enabling the transfer of raw or processed data to, as well as the reception of data from, an external computing device, system, or server.

A power supply 224 may provide power to some or all of the components in the mobile device 210. The power supply 224 may include one or more of a variety of energy storage devices. For example, the power supply 224 may include a rechargeable battery, such as a nickel-cadmium battery or a lithium-ion battery. Additionally, or alternatively, the power supply 224 may include one or more supercapacitors. In some implementations, the power supply 224 may be chargeable (or "rechargeable") using power accessed from, for example, a wall socket (or "outlet") or a photovoltaic device (or "solar cell" or "solar cell array") integrated with the mobile device 210. Additionally, or alternatively, the power supply 224 may be wirelessly chargeable. The power supply 224 may include a power management integrated circuit and a power management system.

As used hereinafter, the term "processing unit" refers to any combination of one or more of a controller of an ultrasonic system (for example, the controller 214), an image processing module (for example, the image processing module 218), or a separate processor of a device that includes the ultrasonic system (for example, the processor 220). In other words, operations that are described below as being performed by or using a processing unit may be performed by one or more of a controller of the ultrasonic system, an image processing module, or a separate processor of a device that includes the ultrasonic sensing system.

Figure 3:
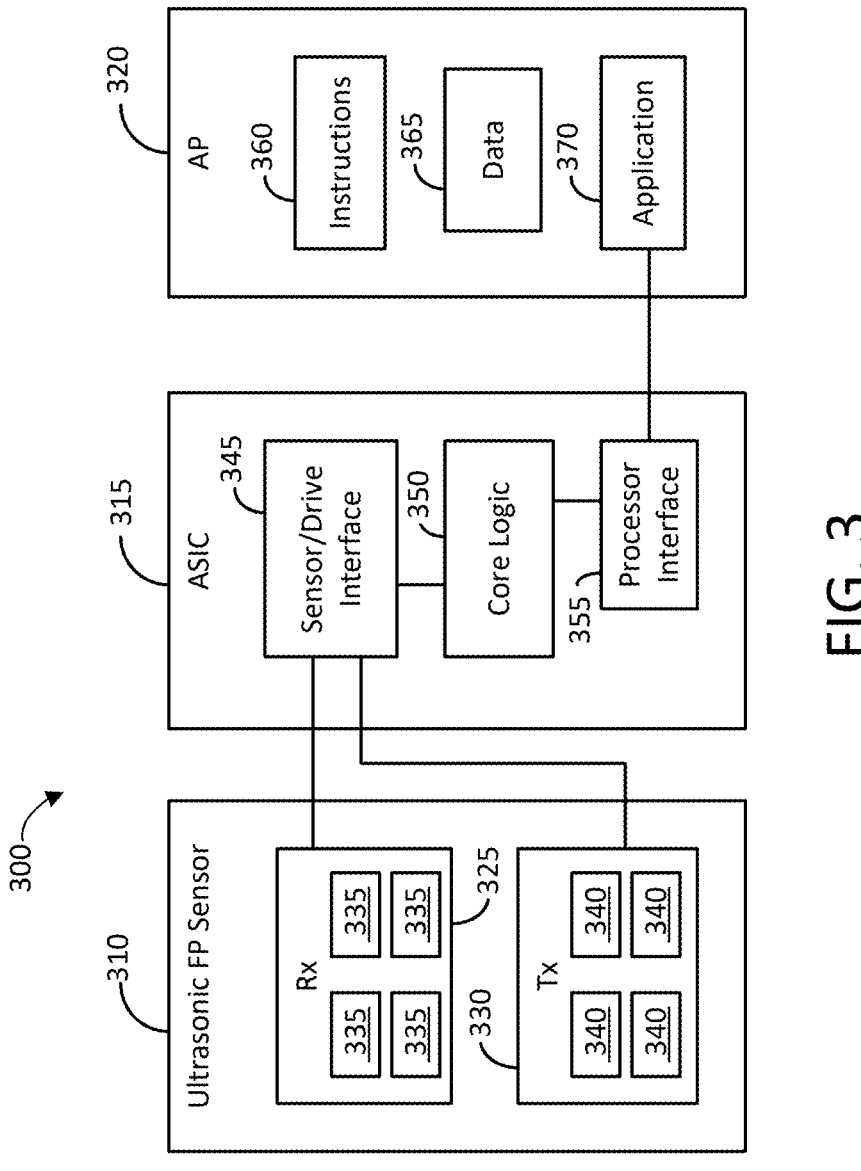
FIG. 3 is a block diagram of an example system that includes an ultrasonic fingerprint sensor array in communication with a controller and an application processor, according to some embodiments.

FIG. 3 shows a block diagram of an example system 300 that includes an ultrasonic fingerprint sensor array in communication with a controller and an application processor according to some implementations. In some aspects, the example system 300 may be viewed as an implementation of an ultrasonic sensing system, such as the 200 ultrasonic sensing system of FIG. 2A A system 300 includes an ultrasonic fingerprint sensor 310, a controller 315, and an application processor 320. The controller 315 may correspond to an integrated circuit (e.g., control chip) such as an ASIC. In some implementations, the controller 315 may correspond to components on one or more circuit boards, flexible printed circuits, or substrates. The system 300 may be integrated within an enclosure of an electronic device or mobile device. For example, the ultrasonic fingerprint sensor 310 and the controller 315 may be integrated within or coupled with a visual display of a mobile device. As described in further detail below, the fingerprint sensor 310 and the controller 315 may be implemented in a flexible printed circuit module of a mobile device that is coupled with one or more visual displays (and/or one or more portions of a flexible visible display) of the mobile device during manufacture.

The ultrasonic fingerprint sensor 310 may correspond to ultrasonic fingerprint sensor systems and/or ultrasonic fingerprint sensors discussed elsewhere herein. The ultrasonic fingerprint sensor 310 may include an ultrasonic receiver (Rx) 325 configured to receive reflections of ultrasonic waves and an ultrasonic transmitter (Tx) 330 configured to generate ultrasonic waves, where ultrasonic waves travel through a device display. These components may be incorporated into, implemented by, and/or part of a flexible fingerprint sensor stack, as described above. The ultrasonic receiver 325 may include an array of sensor elements 335, which may also be referred to as "sensor pixels," "pixel sensor circuits," "sensor circuits," and "pixels." The array of sensor elements 335 may be coupled with a piezoelectric receiver layer, and the piezoelectric receiver layer may be coupled with an electrode receiver layer. Each of the sensor elements 335 may include thin film transistors (TFTs) and other active and passive components. The piezoelectric receiver layer is configured to generate an electric charge from the reflections of ultrasonic waves, and the array of sensor elements 335 converts the electric charge into an electrical signal for generating an image. The ultrasonic transmitter 330 may include an array of electrode segments 340, where the array of electrode segments 340 may be arranged in an M×N array of segments. The array of electrode segments 340 may be coupled to a piezoelectric transmitter layer. Ultrasonic waves are generated by applying a voltage across the piezoelectric transmitter layer by the array of electrode segments 340, thereby causing the piezoelectric transmitter layer to expand or contract in a manner that generates ultrasonic waves. In some implementations, depending on a localized readout from the array of sensor elements 335, a voltage burst or tone burst will be applied to one or more of electrode segments in the array of electrode segments 340 to drive the ultrasonic transmitter 330. The array of electrode segments 340 may be disposed on one side of the piezoelectric transmitter layer to perform a single-ended drive, or the array of electrode segments 340 may be disposed on both sides of the piezoelectric transmitter layer to perform a differential drive. In some implementations, the array of electrode segments 340 may be arranged in a "stripes" design or in an "islands" design.

Though the system 300 shows an ultrasonic fingerprint sensor 310 with separate ultrasonic receiver 325 and ultrasonic transmitter 330, it will be understood that the ultrasonic fingerprint sensor 310 may be implemented with an ultrasonic transceiver with a piezoelectric layer serving as a piezoelectric transmitter and receiver. An array of sensor elements may be coupled to the piezoeletric layer for performing receiving functions, and an array of electrode segments may be coupled to the piezoelectric layer for performing transmitter functions. The array of electrode segments may be coupled to one side of the piezoelectric layer for single-ended driving.

The controller 315 may be electrically coupled to the ultrasonic fingerprint sensor 310, where the controller 315 may be electrically coupled to the ultrasonic receiver 325 and the array of sensor elements 335, and electrically coupled to the ultrasonic transmitter 330 and the array of electrode segments 340. The controller 315 may include a sensor/drive interface 345, core logic 350, and a processor interface 355.

An application processor (AP) 320 may be electrically coupled to the controller 315. The application processor 320 may execute instructions 360 and may store or access data 365. The application processor 320 may execute one or more applications that cause the application processor 320 to communicate with the controller 315. For example, the application processor 320 may execute an application 370.

During operation, the controller 315 may control one or more operations of the ultrasonic fingerprint sensor 310, such as in response to commands received from the application processor 320 via the processor interface 355. In some implementations, the controller 315 is configured to detect a position of an object over the ultrasonic fingerprint sensor 310 using an external touch controller or using piezo-touch capabilities of the ultrasonic transmitter 330 having a piezoelectric transmitter layer.

Where the controller 315 is configured to detect touch using an external touch controller, the external touch controller may be in the form of an external chip or other external circuitry. The external touch controller is separate from the ultrasonic fingerprint sensor 310. The external touch controller may detect touch at a localized area (e.g., x-y coordinates) (e.g., as shown by boxes 140 in FIG. 1A and boxes 180 in FIG. 1B), and the application processor 320 will transmit a signal to the controller 315 to initiate fingerprint sensing on the detected localized area using the ultrasonic fingerprint sensor 310.

Where the controller 315 is configured to detect touch using piezo-touch capabilities of the ultrasonic fingerprint sensor 310, the ultrasonic fingerprint sensor system 310 may detect touch in one of several ways.

In some implementations of piezo-touch, the ultrasonic transmitter 330 having the array of electrode segments 340 may function as an array of passive piezoelectric microphones. Accordingly, low resolution touch location is identified using the array of electrode segments 340. The piezoelectric transmitter layer may receive reflections of ultrasonic waves at a localized area of the ultrasonic transmitter 330, which can be converted to electrical signals to one or more electrode segments 340 indicative of sensing touch at the localized area (e.g., x-y coordinates). The controller 315 may apply a bias voltage to the array of electrode segments 340 to provide desired sampling for detecting ultrasonic waves. This is a passive receiving method without any tone burst event, and the resolution corresponds to the array of electrode segments 340.

In some implementations of piezo-touch, the array of electrode segments 340 and the array of sensor elements 335 may perform an active receiving method for detecting touch in a localized area. First, low resolution touch location is identified using the array of electrode segments 340, where the array of electrode segments 340 function as passive piezoelectric microphones. In response to detecting a position of an object over the ultrasonic fingerprint sensor 310, the controller 315 may apply a voltage burst or tone burst tone or more electrode segments 340 corresponding to the localized area(s) over which touch is detected. The one or more electrode segments 340 may be selected to receive the voltage burst either sequentially or simultaneously via the sensor/drive interface 345 of the controller 315. Application of the voltage burst causes generation of an ultrasonic wave from the piezoelectric transmitter layer of the ultrasonic transmitter 330. The ultrasonic wave or a portion of the ultrasonic wave may be reflected from an object, such as a stylus or finger. The reflected ultrasonic wave may be detected by the piezoelectric receiver 325. An electric charge generated by a piezoelectric receiver layer is converted to an electrical signal by the array of sensor elements 335. The electrical signal includes data output signals that are received by the sensor/drive interface 345 of the controller 315 and processed by the core logic 350 so that a localized readout of the data output signals is generated. The localized readout can provide a digital representation or image of the object to the application processor 320 via the processor interface 355. The localized readout can be based on localized generation of ultrasonic waves from application of the voltage burst to one or more electrode segments 340. This is an active receiving method with a tone burst event, and the resolution is typically greater than the array of electrode segments 340.

In some implementations of piezo-touch, the ultrasonic fingerprint sensor 310 may perform an active receiving method that uses a tone burst for a partial frame readout.

Low resolution touch location is identified using the array of electrode segments 340. Detection of touch by the array of electrode segments 340 can trigger a partial frame readout. The controller 315 may apply a voltage burst or tone burst to one or more electrode segments 340, and a partial frame readout is performed by the array of sensor elements 335 to identify whether an object is a finger or not.

In some implementations of piezo-touch, the ultrasonic receiver 325 with the array of sensor elements 335 may perform a passive receiving method for detecting touch in a localized area. Mechanical deformation of a piezoelectric receiver layer by an object such as a stylus can cause localized generation of ultrasonic waves. In other words, detection of an object such as a stylus can occur by passive detection of shock waves. Electric charge generated by the ultrasonic waves is converted to an electrical signal by the array of sensor elements 335. A full frame or a partial frame readout can be performed by the array of sensor elements 335. In some implementations, a partial frame readout can improve frame rate. Application of a tone burst is not necessary for detecting stylus movement. In some implementations, direction of the stylus can be detected from impulse response shape.

As with FIGS. 1A and 1B and other figures discussed herein, FIGS. 2A-3 are provided as non-limiting examples for the purposes of describing how fingerprint sensors, and ultrasonic fingerprint sensors in particular, may be implemented in various embodiments. Alternative embodiments may rearrange, add, and/or omit components, based on desired functionality, manufacturing concerns, and/or other factors.

As previously noted, embodiments herein can provide enhancements to the implementation of traditional fingerprint sensors, including ultrasonic fingerprint sensors, by providing for multiple fingerprint sensors to be controlled by a single controller (e.g., control chip). In addition to providing the cost savings previously noted, this can also enable enhanced security by leveraging the multiple fingerprint sensors. Additional details are described with respect to FIG. 4. That said, embodiments are not limited to ultrasonic fingerprint sensors. Some embodiments may use other types of fingerprint sensors (e.g., capacitive, optical, etc.), non-fingerprint sensors (e.g., a gesture button, for sensor, etc.), or any combination thereof.

Figure 4:
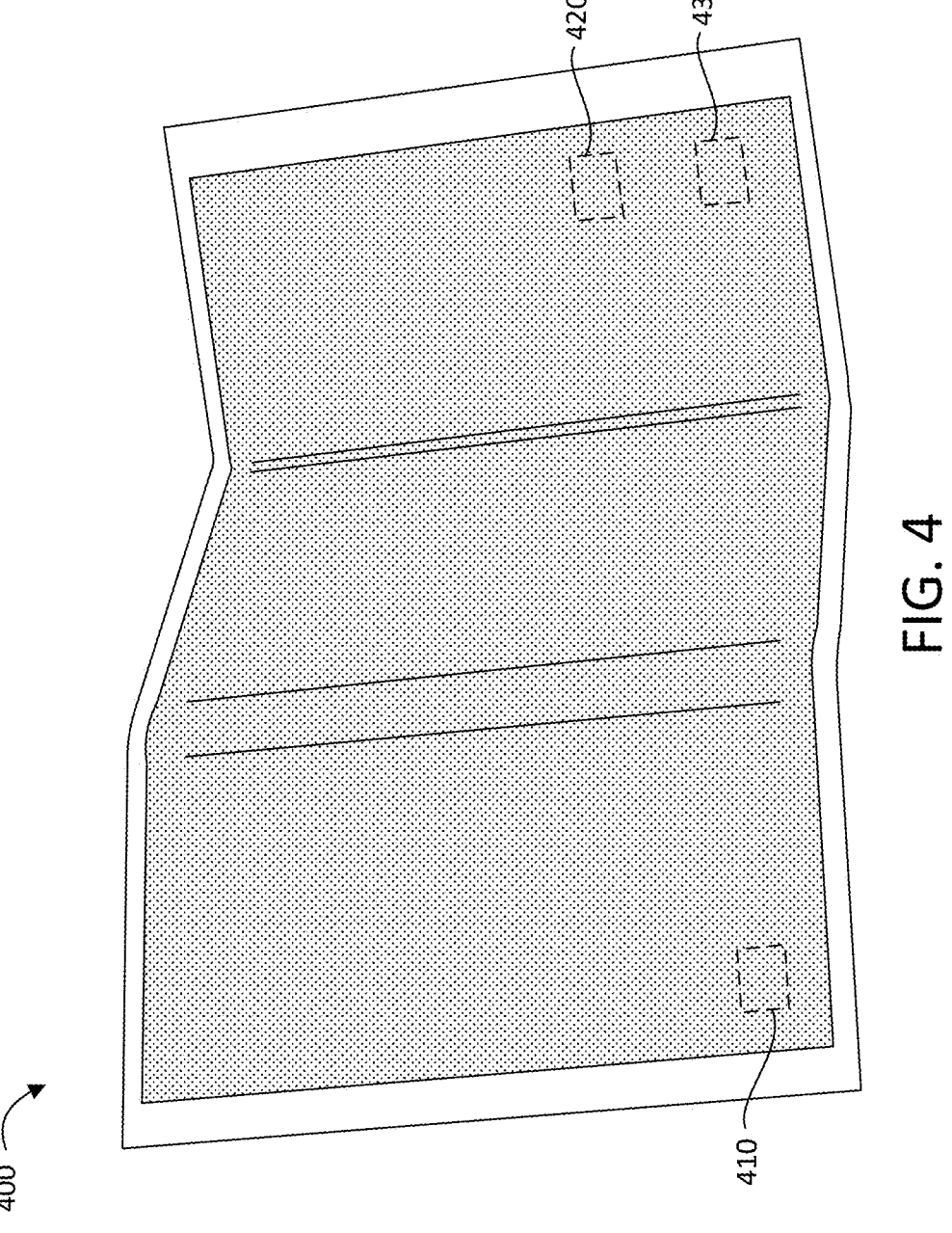
FIG. 4 is an illustration of a foldable electronic device for which enhanced security is enabled by leveraging multiple fingerprint sensors, according to some embodiments.

FIG. 4 is an illustration of a foldable electronic device 400 for which enhanced security is enabled by leveraging multiple fingerprint sensors. In this example, ultrasonic fingerprint sensors are located at a first location 410, a second location 420, and a third location 430. According to some embodiments, ultrasonic fingerprint sensors at these locations 410, 420, and 430 may be operated to increase security (e.g., beyond fingerprint sensing) based on any combination of an order of a fingerprint match, timing of a match, force of a match, or other data that can be obtained during a fingerprint sensing process. As an example, to enroll in fingerprint sensing and/or pass a security screening (e.g., to unlock a device, open an application, etc.) a user may need to first place a finger at the first location 410, then place a finger (the same finger or a different (e.g., preselected) finger) at the second location 420, then place a finger (again, the same or different finger) at the third location 430. In another example, the user may need to place figures at all three locations 410, 420, and 430 simultaneously. In yet another example, to enroll and/or authenticate using fingerprints, the user may place a first finger on a first location 410, place a second finger on a second location 420, or simultaneously place first and second fingers on the first and second locations 410 and 420, respectively. Additionally or alternatively, a user may be asked to place fingers at second location 420 and third location 430 with regular force, but place a finger at first location 410 with heavy force (e.g., above a certain threshold amount of force, detectable by the fingerprint sensor at first location 410). In some embodiments, fingerprint (or multifunction) sensors at locations 410, 420, and 430 may be controlled by the same controller, or may be controlled by (e.g., two or three) different controllers.

By coupling multiple fingerprint sensors to a single controller in the manner described herein, data from multiple fingerprint sensors can be processed directly on the controller chip, rather than stored in a separate memory of the device. This can reduce latency and also reduce the risk of data leakage, increasing security. Further, because fingerprint information obtained by the multiple fingerprint sensors can be stored by the controller, fingerprint information obtained by one sensor may be subsequently used at other locations. For example, in FIG. 4, a user may scan a thumbprint at location 410 for subsequent authentication, then subsequently perform authentication by scanning the thumbprint at location 420 and/or 430. Again, because this thumbprint data may be stored by the controller, the risk of unauthorized access to the thumbprint data is reduced. Information provided by the controller to the application processor and/or memory of the electronic device 400 may be limited to a confirmation that fingerprint authentication was successful, rather than the transfer of any fingerprint data.

Figure 5:
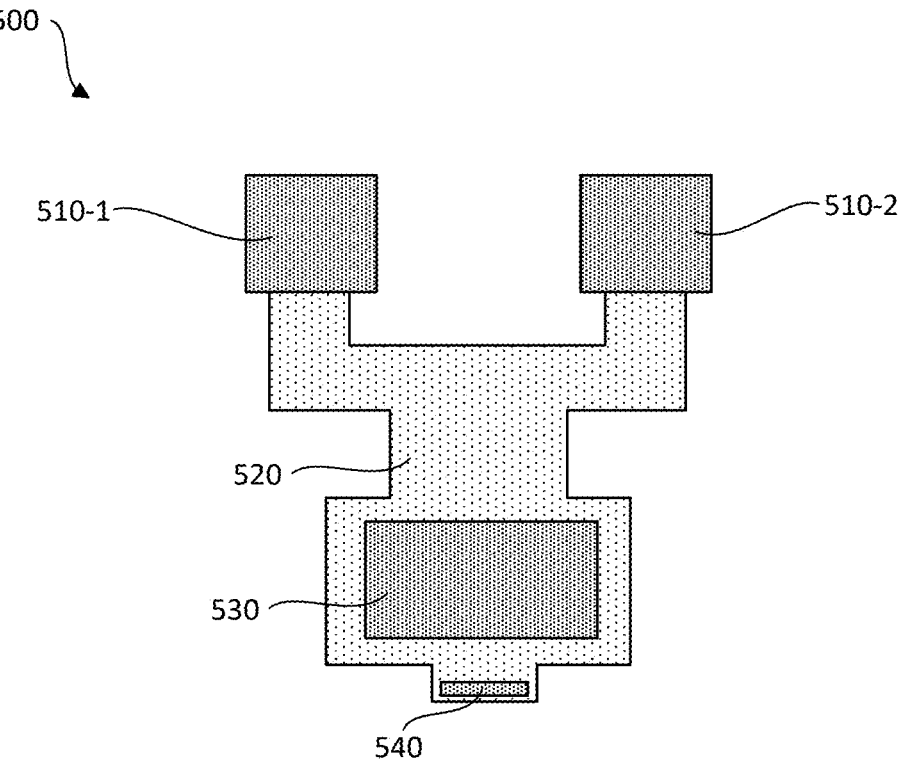
FIG. 5 is an illustration of a flexible printed circuit module, according to a first embodiment.
Figure 6:
FIG. 6 is an illustration of a flexible printed circuit module, according to a second embodiment.
Figure 6:
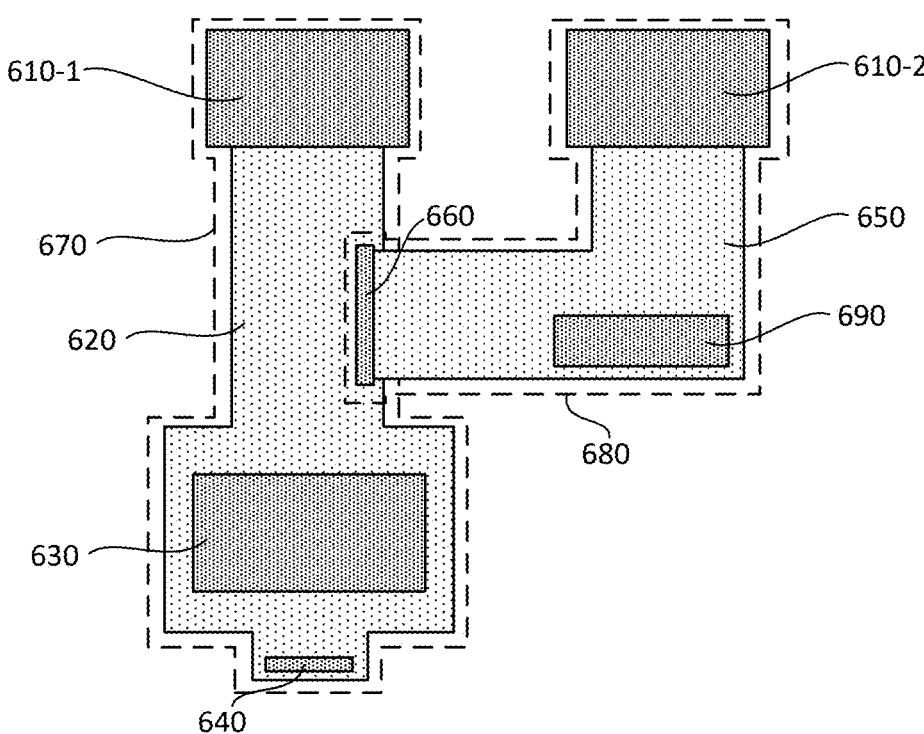

According to embodiments, the manufacturer of electronic devices having multiple fingerprint sensors controlled by a single controller may be enabled in different ways. FIGS. 5 and 6, discussed below, offer examples of how ultrasonic fingerprint sensor systems having multiple fingerprint sensors controlled by a single controller can be implemented in different ways using different flexible printed circuit modules to facilitate the inclusion of multiple ultrasonic fingerprint sensors into various types of electronic devices, including those having flexible displays.

FIG. 5 is an illustration of a flexible printed circuit module 500, according to a first embodiment. In this embodiment, fingerprint sensors 510-1 and 510-2 (collectively and generically referred to herein as fingerprint sensors 510) may correspond with fingerprint sensors described in embodiments above, including ultrasonic FP sensor 310 of FIG. 3, sensor system 202, and/or other fingerprint sensors described herein that may be used in displays as indicated in FIGS. 1A and 1B, for example (e.g., at locations shown by boxes 140 and 180). Thus, fingerprint sensors 510 may comprise a stack of materials as previously described to provide fingerprint sensing. This may include thin-film transistor (TFT) materials that can enable the fingerprint sensors 510 to have some flexibility, allowing them to be used with lightweight, bendable, and even rollable displays, including displays such as those illustrated in FIGS. 1A, 1B, and 4. Additionally or alternatively, embodiments may use silicon (Si) sensors (which may not have the flexibility of TFT materials). Other embodiments may use capacitive sensors, optical sensors, and/or other types of sensors. Additionally or alternatively, fingerprint sensors 510 might be multifunction ultrasonic sensors capable on multiple types of sensing (e.g., fingerprint, stylus input, gesture detection, etc.). Although only two fingerprint sensors are illustrated in FIG. 5, a person of ordinary skill in the art will appreciate that alternative embodiments may have three or more fingerprint sensors, depending on desired functionality.

A flexible printed circuit substrate 520 can be used to electronically connect the fingerprint sensors 510 with a control chip 530. As a person of ordinary skill in the art will appreciate, the flexible printed circuit substrate 520 may comprise a type of circuit board made of a flexible material (e.g., polyimide) with electrical traces (e.g., made from conductors, such as copper) and insulators to allow it to perform as a fully functional printed circuit board that electronically connects various circuits, including integrated circuits, or chips. Its flexibility allows it to be bent or folded, which can be especially beneficial when using the flexible printed circuit module 500 and electronic device with a foldable display. In some embodiments, for example, a portion of the flexible printed circuit substrate 520 may bridge a fold in a foldable device (e.g., folds 170 in electronic device 150 of FIG. 1B), allowing each fingerprint sensor 510 to be on either side of a fold in a display, or on either side of the fold in a device having more than one display. According to some embodiments, any or all of the fingerprint sensors 510 and/or control chip 530 may be mounted onto the flexible printed circuit substrate 520 in the chip-on-flex (COF) configuration.

The control chip 530 may comprise an ASIC, Tx power chip (e.g., amplifier or LC circuit to power fingerprint sensors 510), or other control system as described herein (e.g., control system 204 of FIG. 2A, controller 214 of FIG. 2B, or controller 315 of FIG. 3), configured to control the fingerprint sensors 510. The control chip 530 may not only control the fingerprint sensors 510, but may also communicate with an application processor or other component(s) of an electronic device in order to perform the various functions of fingerprint sensing described herein. The communication between the control chip 530 and the application processor (and/or other component(s)) may be achieved via a connector 540 on the flexible printed circuit module 500. In some embodiments, connector 540 may be electronically connected with a data bus to allow communications between the control chip 530 and one or more other components (e.g., an application processor) located elsewhere on the electronic device into which the flexible printed circuit module 500 is integrated.

During manufacture, each of the fingerprint sensors 510 may be laminated to a respective display (or respective portion of a single display). Testing may then be performed to ensure that the fingerprint sensors 510 work properly. This may include "tuning" the fingerprint sensors 510 to their respective display(s). Tuning parameters may include, for example, timing and frequency parameters for each fingerprint sensor 510, based on the specific display(s) to which each fingerprint sensor 510 is coupled. These parameters may vary, for example, based on glass thickness, which can vary from display to display. Thus, such tuning may be performed after the fingerprint sensors 510 are coupled with the display(s) (e.g., after lamination). In some embodiments, tuning parameters may be stored in the memory of the ASIC 530.

FIG. 6 is an illustration of another flexible printed circuit module 600, according to a second embodiment. In many aspects, the flexible printed circuit module 600 of FIG. 6 is similar to the flexible printed circuit module 500 of FIG. 5. More specifically, it has fingerprint sensors 610-1 and 610-2 (collectively and generically referred to herein as fingerprint sensors 610), a first flexible printed circuit substrate 620, a control chip 630, and a first connector 640. These components may have functionality similar to the corresponding components in FIG. 5, described above.

A key difference between the flexible printed circuit module 600 of FIG. 6 and the flexible printed circuit module 500 of FIG. 5 is the use of a second printed circuit substrate 650. As shown in FIG. 6, the first printed circuit substrate 620 includes the control chip 630 and a first fingerprint sensor 610-1, either or both of which may be mounted onto the first flexible printed circuit substrate 620 using COF technology, according to some embodiments. A second fingerprint sensor 610-2 is mounted on and/or incorporated into the second flexible printed circuit substrate 650. The second flexible printed circuit substrate 650 is electronically coupled with the first flexible printed circuit substrate 620 via a second connector 660 (e.g., a zero insertion force (ZIF) connector or similar) in what could be considered a "master" and "slave" design, where a first submodule 670 of the flexible printed circuit module 600 (e.g., comprising the control chip 630, among other components) may operate as a master component, and a second submodule 680 (e.g., comprising the second flexible printed circuit substrate 650 and second fingerprint sensor 610-2) may operate as a slave component. Alternative embodiments may include one or more additional fingerprint sensors on the first portion 670 and/or second portion 680. Additionally or alternatively, additional fingerprint sensors may be included in additional submodules (each of which may comprise one or more fingerprint sensors), which may be connected to the first submodule 670 in a manner similar to the second submodule 680.

An additional feature that the flexible printed circuit module 600 may include is a memory chip 690 coupled with the second flexible printed circuit substrate 650. According to some embodiments, the memory chip 690 may comprise an erasable programmable read-only memory (EPROM) and/or other nonvolatile memory, for example. Together with the second connector 660, the memory chip 690 can enable the second submodule 680 to be separately manufactured from the first submodule 670. More specifically, during manufacture, after the second fingerprint sensor 610-2 is coupled to a display (e.g., after lamination), the second submodule 680 may be connected via the second connector 660 to a testing board capable of performing the tuning of the second fingerprint sensor 610-2 to its display in a manner similar to the controller chip 630. The testing board can then write the tuning parameters to the memory chip 690, enabling the second printed circuit module 680 to be manufactured separately from the first submodule 670. (In other words, the first submodule 670 and second submodule 680 may be manufactured separately, and subsequently coupled as illustrated in FIG. 6 during the assembly process.) The second submodule 680 subsequently may be coupled with the first submodule 670 via the second connector 660. Thus, any second module 680, once tuned, can be coupled with any first module 670. This can simplify the manufacturing process that enables two or more fingerprint sensors 610 to be coupled to a single controller chip 630. Once the second submodule 680 is coupled with the first submodule 670, the second fingerprint sensor 610-2 is electrically and communicatively coupled with the controller chip 630. The memory chip 690 may also be electrically and communicatively coupled with the controller chip 630. However, this may depend on the capabilities of the controller chip 630. If the controller chip 630 does not have I/O pins available to read from and/or write to the memory chip 690, some embodiments may electrically couple the memory chip 690 to the first connector 640 (e.g., a flexible printed circuit (FPC) connector or other board-to-board (B2B) connector), enabling another component (e.g., an application processor) to read from and/or write to the memory chip 690 (e.g., using a bus such as an inter-integrated circuit (I2C) bus) and relay the read/write operations to the controller chip 630. In some embodiments, the controller chip 630 may store the tuning parameters stored in the memory chip 690 once the second submodule 680 is coupled with the first submodule 670 (and, if applicable, an application processor relays information from the memory chip 690 to the controller chip 630).

Figure 7:
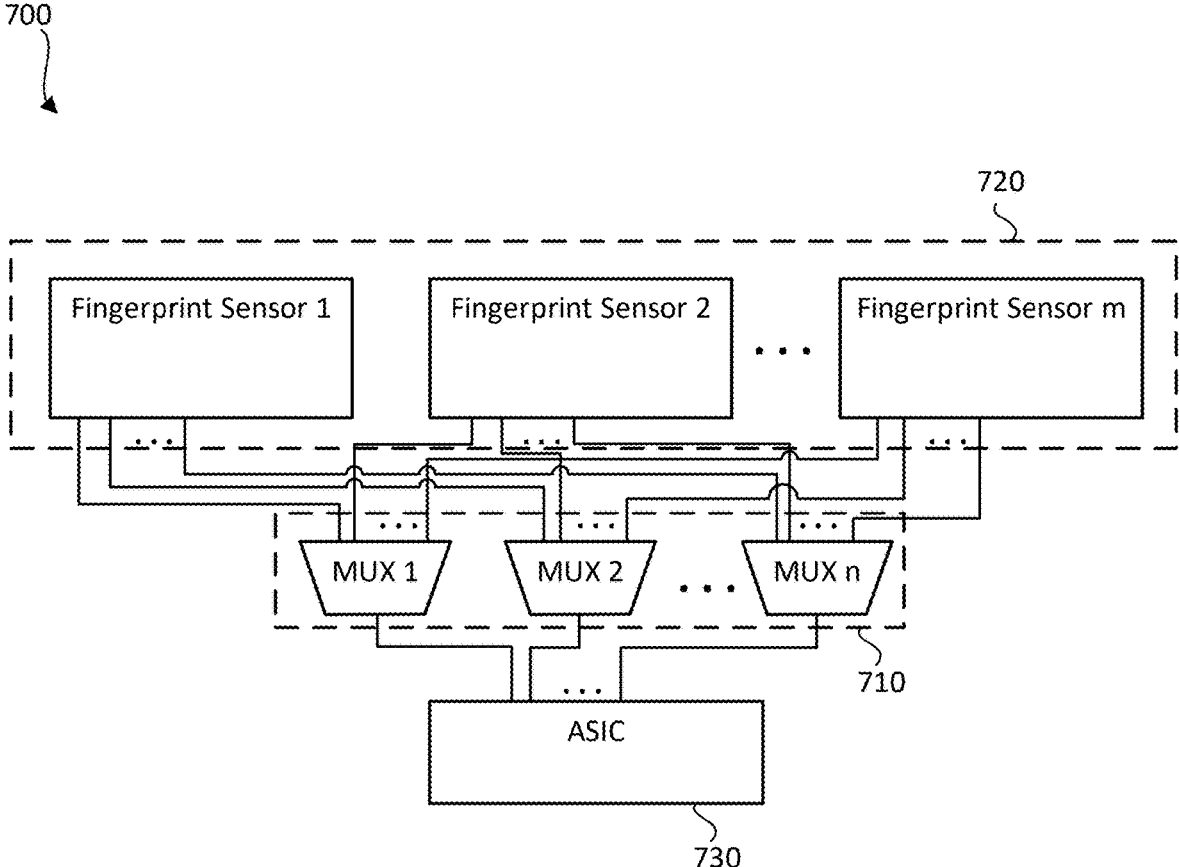
FIG. 7 is a schematic diagram of a configuration in which a number of muxes may be used to route output signals from a number of fingerprint sensors, according to some embodiments.
Figure 8:
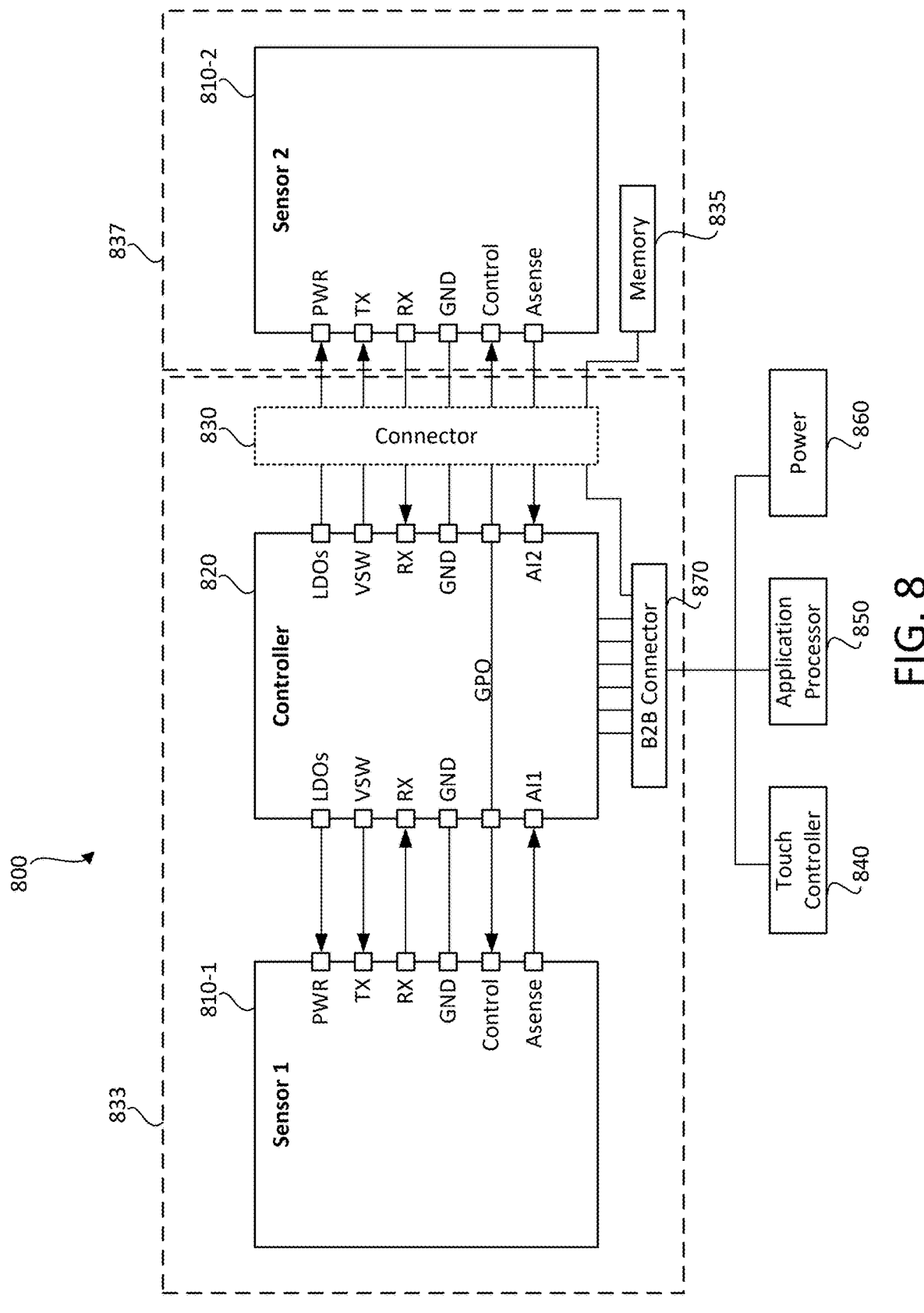
FIG. 8 is a schematic illustration of a first example configuration having two fingerprint sensors and controller.

Depending on the capabilities of the controller chip, some additional circuitry may be needed, in some embodiments, to help route signals from a plurality of fingerprint sensors to the correct pins of a controller chip. This can include components such as multiplexer(s) (mux(es)), switch(es), and/or other such circuitry. FIGS. 7 and 8, discussed below, show examples of how a plurality of fingerprint sensors may be coupled with an existing ASIC FIG. 7 is a schematic diagram of a configuration 700 in which a number, n, of muxes 710 may be used to route output signals from a number, m, of fingerprint sensors 720 to an ASIC 730. It will be understood that the configuration 700 represents a generalized implementation in which m>2 and n>1, and where other electronic connections between components (e.g., control signals to muxes 710, other signaling between the fingerprint sensors 720 and ASIC 730, etc.) are omitted to avoid clutter. In some embodiments, muxes 710 may comprise one or more discrete components.

A configuration like this can allow an ASIC 730 to switch between signals of the various fingerprint sensors 720. This configuration 700 may provide similar functionality, from a user's perspective, to a configuration in which each fingerprint sensor has a separate ASIC. That is, an ASIC may switch between fingerprint sensors 720 at a rate that allows fingerprint sensing of the various fingerprint sensors 720 to occur nearly simultaneously from the perspective of the user. That said, there may be additional considerations to take into account when controlling multiple fingerprint sensors 720 with a single ASIC 730. Some such considerations are described below with respect to FIGS. 8-10.

FIG. 8 is a schematic illustration of a first example configuration 800, illustrating how pins of a first sensor 810-1 and a second sensor 810-2 (collectively and generically referred to herein as sensors 810) can be routed to a controller 820 (optionally through connector 830, as illustrated in FIG. 6). The configuration 800 further includes a memory 835 (e.g., EPROM), which may be used as described above, e.g., with respect to FIG. 6. Submodules 833 and 837 may correspond with submodules 670 and 680 in FIG. 6, for example. Arrows show the direction of signals. Sensors 810 may comprise, for example, ultrasonic fingerprint sensors, multipurpose ultrasonic sensors, optical and/or capacitive fingerprint sensors, and/or other types of sensors associated with the display. Because controller designs very, it will be understood that the example configuration 800 is provided for illustrative purposes, and the discussion below illustrates some considerations that may be taken into account when multiple sensors are controlled by a single control chip (e.g., controller 820). Alternative embodiments utilizing various alternative controllers may utilize similar considerations based on the types of pins available for a specific controller (e.g., ASIC or TX power chip) in a particular implementation. The example configuration 800 in which a single controller 820 is used to control two sensors 810, may reflect previously-described embodiments in FIGS. 5-7, for example. Further, it will be understood that the pins (inputs and outputs of each component) illustrated in FIG. 8 may represent only a subset of the total number of pins for any or all of the components. The considerations described below with respect to the specific controllers shown in FIGS. 8-10 may be applied to other types of control chips. It can be further noted that the configuration 800 also identifies various components (touch controller 840, application processor 850, and power source 860) of the mobile device with which the controller 820 and memory 835 may communicate via the B2B connector 870. (Subsequent configurations illustrated in FIGS. 9 and 10 do not explicitly show such components, but may be similarly connected.)

In this example, the controller 820 has various outputs that can be used to control the two sensors 810. These pins include low-dropout voltage regulator (LDO), voltage-controlled switch (VSW), receive (RX), electrical ground (GND), general-purpose output (GPO), and sense (Asense), and they may be connected (e.g., via conductive traces on a flexible printed circuit (FPC), as previously described) with corresponding pins of the sensors 810. (Note that VSW pins of the controller 820 may be connected with transmit (TX) pins of each sensor 810, as shown.) In this example, the controller 820 may have sufficient Rx channels to receive sensor data from the Rx pins of each sensor 810 without the need to switch between pins. However, in some embodiments, switching can be performed by one or more muxes, in the manner shown in FIG. 7 (or FIG. 10, described below), for example, and may require the use of additional pins of the controller 820 to provide a control signal to control the switching.)

In this example, the Asense pin of the sensors may comprise sensor information, such as temperature and/or voltage-based sensing, which may be used by the controller 820 for accurate sensing. According to some embodiments, considerations for temperature sensing when coupling a controller to multiple sensors may not only include whether there are sufficient temperature sensing (e.g., Asense) pins, but also power and timing considerations. In the example in FIG. 8, the controller 820 has two sense pins (AI1 and AI2), enabling the controller 820 to control sensing (e.g., temperature sensing) for each sensor 810 without the need to switch between sensors 810. Even so, the sensing function may require the controller 820 to drive in output current to power a sensor in each sensor 810 (e.g., a temperature sense diode). Powering sensors in both sensors 810 at the same time may require a relatively large amount of power, which could make the controller 820 bulkier. Thus, according to some embodiments, the controller 820 may drive sensing for sensors 810 at different times.

Figure 9:
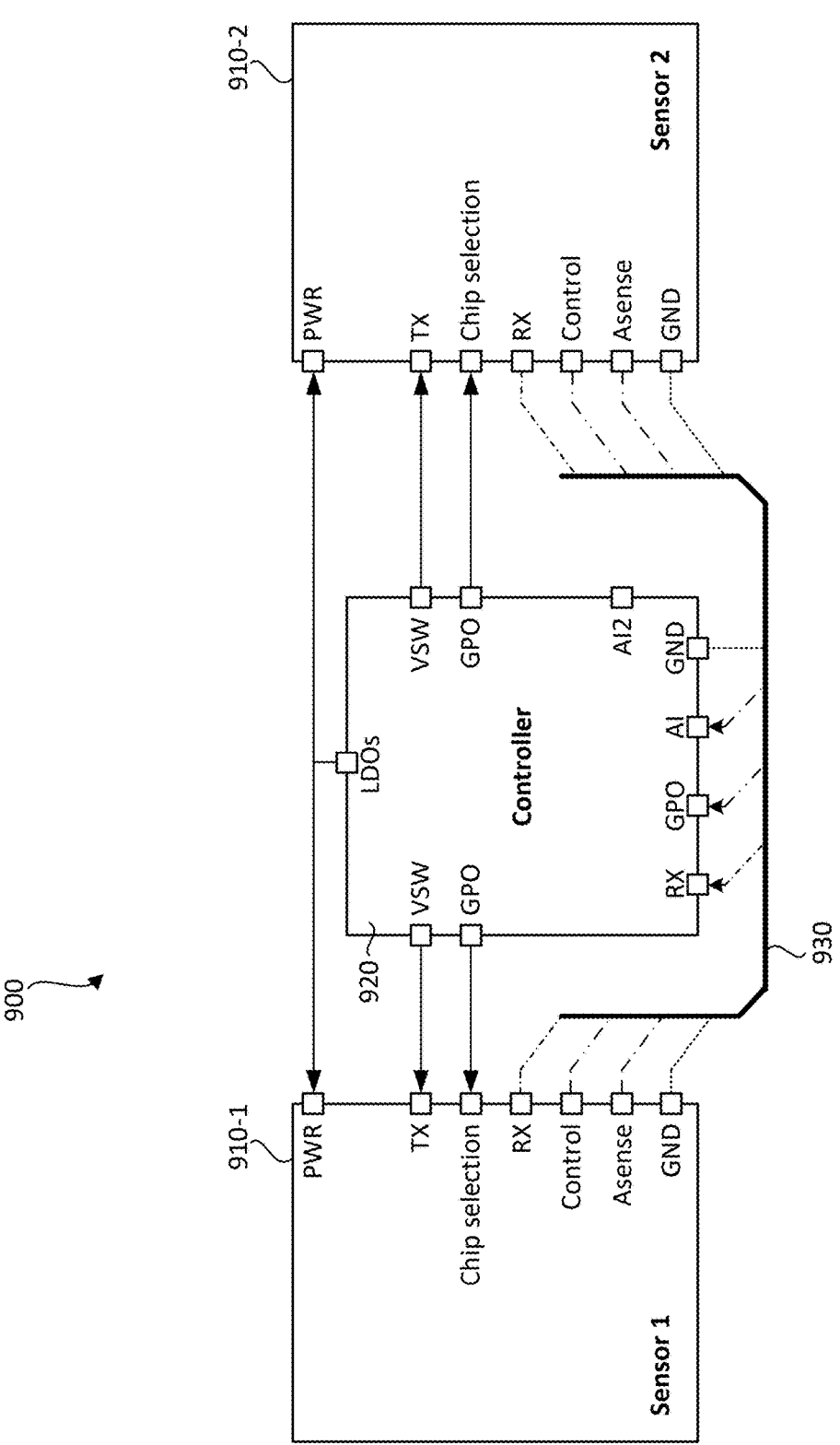
FIG. 9 is a schematic illustration of a second example configuration having two fingerprint sensors and controller.

Embodiments that utilize switching between one or more sense (Asense) pins (in instances in which the number of sensors is larger than the number of sense pins of a controller) may do so in a manner that accommodates the current output of the sense pin(s). For TFT-based ultrasonic sensors, a knowledge of the temperature where the sensor is located may be needed for sensing to work properly. Thus, the temperature is monitored (e.g., using Asense pins) to determine how a baseline is drifting/changing. (If a change occurs beyond a threshold, a new temperature/baseline may be stored by the controller.) According to some embodiments, controllers may switch between one or more sense pins by utilizing one or more internal switches in the controller to perform sensing (e.g., temperature sensing) with more than one sensors. This can allow an controller to read signals from multiple sensors sequentially using a single port (pin) on the controller. Because monitoring sensing may occur with a relatively low periodicity (e.g., every 30 seconds), but switching components may provide switching between sensors at a relatively high speed (e.g., 1 ms), such switching can easily accommodate sensing (e.g., temperature sensing) across multiple sensors. Again, a controller may use one or more pins to provide a control signal to control switching between sensors, and switching in this manner can be expanded to other types of pins, in addition, or as an alternative to, sense pins. FIG. 9 is a schematic illustration of a second example configuration 900, providing another example of how pins of sensors 910-1 and 910-2 can be routed to a controller 920. As can be seen, the pins of the sensors 910 and controller 920 are generally similar to those illustrated in FIG. 8, described above, and may operate in a similar manner. In this configuration 900, however, various pins of the controller 920 are connected with various pins of the sensors 910 using various traces/conductors, represented by line 930. Thus, ground (GND) pins of the controller 920 and sensors 910 may be electrically connected by a single conductor/trace, RX pins of the controller 920 and sensors 910 may be electrically connected by another single conductor/trace, and so forth. General outputs (GPOs) of the controller 920 may be used to activate different sensors 910, one at a time, to control each sensor 910. For example, the controller 920 may activate the first sensor 910-1 at a first time, allowing the RX, GPO, and AI pins of the controller 920 to receive outputs from the first sensor 910-1 as illustrated. Subsequently (e.g., once the first sensor 910-1 is deactivated), the controller may then activate the second sensor 910-2 at a second time, allowing the RX, GPO, and AI pins of the controller 920 to receive outputs from the second sensor 910-2 as illustrated.

Figure 10:
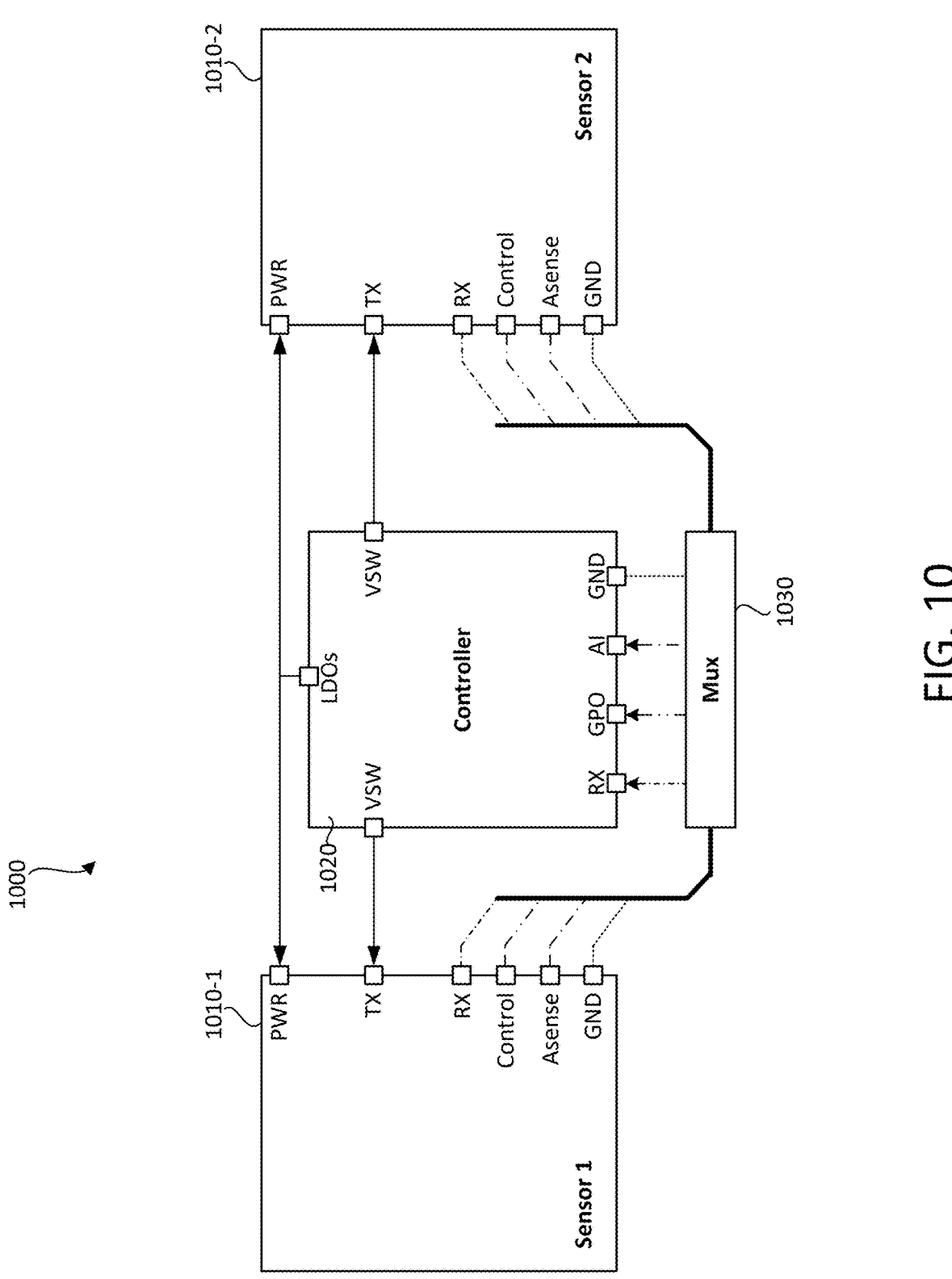
FIG. 10 is a schematic illustration of a third example configuration having two fingerprint sensors and controller.

FIG. 10 is a schematic illustration of a third example configuration 1000, providing yet another example of how pins of sensors 1010-1 and 1010-2 can be routed to a controller 1020. Again, the pins of the sensors 1010 and controller 1020 are generally similar to those illustrated in FIG. 8, described above, and may operate in a similar manner. In this configuration 1000, various pins of the controller 1020 are connected with various pins of the sensors 1010 via a mux 1030. Thus, in contrast with the configuration 900 in FIG. 9 in which the controller 920 activated each sensor 910, the controller 1020 in the configuration 1000 of FIG. 10 will simply switch between the outputs of each sensor 1010 using the mux 1030. (It can be noted that outputs of the controller 1020 that control the switching of the mux 1030 are not illustrated in FIG. 10.)

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

Implementation examples are described in the following numbered clauses:

Clause 1: An ultrasonic sensor system comprising: a plurality of ultrasonic sensors, wherein each ultrasonic sensor of the plurality of ultrasonic sensors is configured to obtain respective sensor information by generating and receiving ultrasonic waves traveling through a display; a controller chip configured to obtain the respective sensor information from each ultrasonic sensor of the plurality of ultrasonic sensors; a first flexible printed circuit substrate onto which the controller chip and a first ultrasonic sensor of the plurality of ultrasonic sensors are mounted, the first flexible printed circuit substrate further comprising an electrical connector; and a second flexible printed circuit substrate onto which a second ultrasonic sensor of the plurality of ultrasonic sensors is mounted, the second flexible printed circuit substrate electrically coupled with the first flexible printed circuit substrate via the electrical connector; wherein: the first ultrasonic sensor is electrically coupled with the controller chip via the first flexible printed circuit substrate, and the second ultrasonic sensor is electrically coupled with the controller chip via the second flexible printed circuit substrate, the electrical connector, and the first flexible printed circuit substrate.

Clause 2: The ultrasonic sensor system of clause 1, further comprising a memory chip mounted onto the second flexible printed circuit substrate.

Clause 3: The ultrasonic sensor system of v 2, wherein the memory chip comprises an erasable programmable read-only memory (EPROM).

Clause 4: The ultrasonic sensor system of any one of clauses 2-3, wherein the memory chip is configured to store one or more tuning parameters for the second ultrasonic sensor.

Clause 5: The ultrasonic sensor system of any one of clauses 2-4, wherein the memory chip is electrically coupled with a second electrical connector of the first flexible printed circuit substrate, enabling an application processor to read information stored by the memory chip when the application processor is electrically coupled with the ultrasonic sensor system via the second electrical connector.

Clause 6: The ultrasonic sensor system of any one of clauses 1-5, wherein each ultrasonic sensor of the plurality of ultrasonic sensors is configured to be coupled with a different respective planar section of a foldable display or a different respective display of an electronic device.

Clause 7: The ultrasonic sensor system of any one of clauses 1-6, further comprising a multiplexer configured to enable the controller chip to switch between communicating with the first ultrasonic sensor and the second ultrasonic sensor.

Clause 8: The ultrasonic sensor system of any one of clauses 1-7, wherein the first flexible printed circuit substrate, the second printed circuit substrate, or both, comprises a chip-on-flex (COF).

Clause 9: The ultrasonic sensor system of any one of clauses 1-8, wherein the first ultrasonic sensor, the second ultrasonic sensor, or both, comprises a thin-film transistor (TFT) or a silicon (Si) sensor.

Clause 10: The ultrasonic sensor system of any one of clauses 1-9, wherein the controller chip comprises an application-specific integrated circuit (ASIC).

Clause 11: An ultrasonic sensor system comprising: a plurality of ultrasonic sensors, wherein each ultrasonic sensor of the plurality of ultrasonic sensors is configured to obtain respective sensor information by generating and receiving ultrasonic waves traveling through a display; a controller chip configured to obtain the respective sensor information from each ultrasonic sensor of the plurality of ultrasonic sensors; and a set of one or more flexible printed circuit substrates electrically coupled with the controller chip and the plurality of ultrasonic sensors, the set of flexible printed circuit substrates electrically coupling the controller chip with each ultrasonic sensor of the plurality of ultrasonic sensors.

Clause 12: The ultrasonic sensor system of clause 11, wherein the set of one or more flexible printed circuit substrates comprises a single substrate onto which a first ultrasonic sensor of the plurality of ultrasonic sensors, a second ultrasonic sensor of the plurality of ultrasonic sensors, and the controller chip are mounted.

Clause 13: The ultrasonic sensor system of clause 12, wherein the controller chip comprises a memory that is configured to store one or more respective tuning parameters for each of the first ultrasonic sensor and the second ultrasonic sensor.

Clause 14: The ultrasonic sensor system of any one of clauses 11-13, wherein the set of one or more flexible printed circuit substrates comprises: a first flexible printed circuit substrate onto which the controller chip a first ultrasonic sensor of the plurality of ultrasonic sensors are mounted; and a second flexible printed circuit substrate onto which a second ultrasonic sensor of the plurality of ultrasonic sensors is mounted, the second flexible printed circuit substrate electrically coupled with the first flexible printed circuit substrate via an electrical connector.

Clause 15: The ultrasonic sensor system of clause 14, further comprising a memory chip mounted onto the second flexible printed circuit substrate, the memory chip configured to store one or more tuning parameters for the second ultrasonic sensor.

Clause 16: The ultrasonic sensor system of clause 15, wherein the memory chip is configured to enable an application processor to access the stored one or more tuning parameters for the second ultrasonic sensor via a second electrical connector of the first flexible printed circuit substrate.

Clause 17: The ultrasonic sensor system of any one of clauses 11-16, wherein each ultrasonic sensor of the plurality of ultrasonic sensors is configured to be coupled with a different respective display of an electronic device.

Clause 18: The ultrasonic sensor system of clause 17, wherein each ultrasonic sensor of the plurality of ultrasonic sensors is configured to be coupled with a different respective planar section of a foldable display, and wherein at least one flexible printed circuit substrate of the set of one or more flexible printed circuit substrates is configured to bridge at least one fold of the foldable display.

The ultrasonic sensor system of any one of clauses 11-17, wherein the first flexible printed circuit substrate, the second printed circuit substrate, or both, comprises a chip-on-flex (COF).

The ultrasonic sensor system of any one of clauses 11-18, wherein the first ultrasonic sensor, the second ultrasonic sensor, or both, comprises a thin-film transistor (TFT) or a silicon (Si) sensor.

What is claimed is:

1. An ultrasonic sensor system comprising:
a plurality of ultrasonic sensors, wherein each ultrasonic sensor of the plurality of ultrasonic sensors is configured to obtain respective sensor information by generating and receiving ultrasonic waves traveling through a display;
a controller chip configured to obtain the respective sensor information from each ultrasonic sensor of the plurality of ultrasonic sensors;
a first flexible printed circuit substrate onto which the controller chip and a first ultrasonic sensor of the plurality of ultrasonic sensors are mounted, the first flexible printed circuit substrate further comprising an electrical connector;
a second flexible printed circuit substrate onto which a second ultrasonic sensor of the plurality of ultrasonic sensors is mounted, the second flexible printed circuit substrate electrically coupled with the first flexible printed circuit substrate via the electrical connector; and
a memory chip mounted onto the second flexible printed circuit substrate and configured to store one or more tuning parameters for the second ultrasonic sensor accessible to the controller chip via the electrical connector;
wherein:
the first ultrasonic sensor is electrically coupled with the controller chip via the first flexible printed circuit substrate, and
the second ultrasonic sensor is electrically coupled with the controller chip via the second flexible printed circuit substrate, the electrical connector, and the first flexible printed circuit substrate.

2. The ultrasonic sensor system of claim 1, wherein the memory chip comprises an erasable programmable read-only memory (EPROM).

3. The ultrasonic sensor system of claim 1, wherein the memory chip is configured to store one or more tuning parameters for the second ultrasonic sensor.

4. The ultrasonic sensor system of claim 1, wherein the memory chip is electrically coupled with a second electrical connector of the first flexible printed circuit substrate, enabling an application processor to read information stored by the memory chip when the application processor is electrically coupled with the ultrasonic sensor system via the second electrical connector.

5. The ultrasonic sensor system of claim 1, wherein each ultrasonic sensor of the plurality of ultrasonic sensors is configured to be coupled with a different respective planar section of a foldable display or a different respective display of an electronic device.

6. The ultrasonic sensor system of claim 1, further comprising a multiplexer configured to enable the controller chip to switch between communicating with the first ultrasonic sensor and the second ultrasonic sensor.

7. The ultrasonic sensor system of claim 1, wherein the first flexible printed circuit substrate, the second flexible printed circuit substrate, or both, comprises a chip-on-flex (COF).

8. The ultrasonic sensor system of claim 1, wherein the first ultrasonic sensor, the second ultrasonic sensor, or both, comprises a thin-film transistor (TFT) or a silicon (Si) sensor.

9. The ultrasonic sensor system of claim 1, wherein the controller chip comprises an application-specific integrated circuit (ASIC).

10. An ultrasonic sensor system comprising:
a plurality of ultrasonic sensors, wherein each ultrasonic sensor of the plurality of ultrasonic sensors is configured to obtain respective sensor information by generating and receiving ultrasonic waves traveling through a display;
a controller chip configured to obtain the respective sensor information from each ultrasonic sensor of the plurality of ultrasonic sensors;
a set of one or more flexible printed circuit substrates electrically coupled with the controller chip and the plurality of ultrasonic sensors, the set of flexible printed circuit substrates electrically coupling the controller chip with each ultrasonic sensor of the plurality of ultrasonic sensors, wherein the set of one or more flexible printed circuit substrates comprises:
a first flexible printed circuit substrate onto which the controller chip a first ultrasonic sensor of the plurality of ultrasonic sensors are mounted; and
a second flexible printed circuit substrate onto which a second ultrasonic sensor of the plurality of ultrasonic sensors is mounted, the second flexible printed circuit substrate electrically coupled with the first flexible printed circuit substrate via an electrical connector; and
a memory chip mounted onto the second flexible printed circuit substrate, the memory chip configured to store one or more tuning parameters for the second ultrasonic sensor, wherein the memory chip is configured to enable an application processor to access the stored one or more tuning parameters for the second ultrasonic sensor via a second electrical connector of the first flexible printed circuit substrate.

11. The ultrasonic sensor system of claim 10, wherein each ultrasonic sensor of the plurality of ultrasonic sensors is configured to be coupled with a different respective display of an electronic device.

12. The ultrasonic sensor system of claim 11, wherein each ultrasonic sensor of the plurality of ultrasonic sensors is configured to be coupled with a different respective planar section of a foldable display, and wherein at least one flexible printed circuit substrate of the set of one or more flexible printed circuit substrates is configured to bridge at least one fold of the foldable display.

13. The ultrasonic sensor system of claim 10, wherein the first flexible printed circuit substrate, the second flexible printed circuit substrate, or both, comprises a chip-on-flex (COF).

14. The ultrasonic sensor system of claim 10, wherein the first ultrasonic sensor, the second ultrasonic sensor, or both, comprises a thin-film transistor (TFT) or a silicon (Si) sensor.

* * * * *